United States Patent
Joffe et al.

(10) Patent No.: US 7,437,535 B1
(45) Date of Patent: Oct. 14, 2008

(54) METHOD AND APPARATUS FOR ISSUING A COMMAND TO STORE AN INSTRUCTION AND LOAD RESULTANT DATA IN A MICROCONTROLLER

(75) Inventors: Alexander Joffe, Palo Alto, CA (US); Asad Khamisy, Fremont, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 806 days.

(21) Appl. No.: 10/980,141

(22) Filed: Nov. 1, 2004

Related U.S. Application Data

(62) Division of application No. 10/117,452, filed on Apr. 4, 2002, now abandoned.

(51) Int. Cl.
*G06F 9/312* (2006.01)
(52) U.S. Cl. ............................................. 712/34
(58) Field of Classification Search .................. 712/34
See application file for complete search history.

(56) References Cited

U.S. PATENT DOCUMENTS

| | | | | |
|---|---|---|---|---|
| 3,905,023 | A | | 9/1975 | Perpiglia .................... 714/6 |
| 5,404,560 | A | * | 4/1995 | Lee et al. .................. 712/208 |
| 5,469,558 | A | | 11/1995 | Lieberman et al. ........ 710/105 |
| 5,790,881 | A | | 8/1998 | Nguyen .................... 712/34 |
| 6,065,103 | A | | 5/2000 | Tran et al. ................ 711/156 |
| 6,330,626 | B1 | | 12/2001 | Dennin et al. ............... 710/52 |
| 6,338,108 | B1 | * | 1/2002 | Motomura ................. 710/110 |
| 6,532,530 | B1 | * | 3/2003 | Kim et al. ................... 712/35 |
| 6,640,220 | B1 | * | 10/2003 | Firlit et al. ................... 707/3 |
| 7,079,147 | B2 | * | 7/2006 | Wichman et al. ........... 345/503 |
| 7,089,555 | B2 | * | 8/2006 | Calvignac et al. .......... 718/100 |
| 2003/0061443 | A1 | | 3/2003 | Frank et al. ................. 711/118 |

OTHER PUBLICATIONS

U.S. Appl. No. 10/103,436 entitled "Dynamic Allocation of Packets to Tasks," Nathan Elnathan et al., filed Mar. 20, 2002.
U.S. Appl. No. 10/103,393 entitled "Reordering of Out-of-Order Packets," Nathan Elnathan, filed Mar. 20, 2002.
U.S. Appl. No. 10/103,415 entitled "Asymmetric Coherency Protection," Ilan Pardo, filed Mar. 20, 2002.
U.S. Appl. No. 10/117,394 entitled "Method and Apparatus to Suspend and Resume on Next Instruction for a Microcontroller," Alexander Joffe, filed Apr. 4, 2002.
U.S. Appl. No. 10/117,781 entitled "Logic for Synchronizing Multiple Tasks at Multiple Locations in an Instruction Stream," Alexander Joffe et al., filed Apr. 4, 2002.
U.S. Appl. No. 10/117,779 entitled "Memory Co-Processor for a Multi-Tasking System," Alexander Joffe et al., filed Apr. 4, 2002.
U.S. Appl. No. 10/117,780 entitled "Sequencing Semaphore," Alexander Joffe et al., filed Apr. 4, 2002.

\* cited by examiner

*Primary Examiner*—Eric Coleman
(74) *Attorney, Agent, or Firm*—Michael Shenker; MacPherson Kwok Chen & Heid LLP

(57) ABSTRACT

This disclosure relates to communications among processors, coprocessors and memory. Specifically, a method and apparatus provide a single-cycle instruction ("store-and-load") that stores a command to a co-processor to atomically process data and that loads resultant processed data.

64 Claims, 14 Drawing Sheets

| store_load 201 | source address 202 | command 203 | destination 204 | ... 205 |

*FIG. 2A*

| store_loadx 206 | index to a pointer to external memory address 207 | register pointing to address containing command to be performed on external memory (e.g., policing, statistics) 208 | identity of register to load modified data 209 | ... 210 |

*FIG. 2B*

```
         assembly language instructions
                    300

; load external memory pointer 0 (xmp0)
; with address of external memory to be
; modified
#define XMEM_START 0h
mviw xmp0, XMEM_START, #DDD ; load register 0 (r0) with command
; for memory co-processor
; 0 B000 xxxx 0000 2B10
mviw r0_0, 0B000h, #WWW
mviw r0_4, 02B10h, #DDD define SPU_XMP0_AOP(baddr) (090h+(baddr))
store_loadx #SPU_XMP0_AOP(15), R0, R1, 0

; copy results from register 1
; to register 2
move R2, R1, #LLL
```

METHOD AND APPARATUS FOR ISSUING A COMMAND TO STORE AN INSTRUCTION AND LOAD RESULTANT DATA IN A MICROCONTROLLER

CROSS REFERENCE TO RELATED APPLICATIONS

The present application is a division of U.S. patent application Ser. No. 10/117,452 filed on Apr. 4, 2002 now abandoned, incorporated herein by reference.

FIELD OF THE INVENTION

The invention relates to processors, and more particularly to instructions for increasing throughput on reduced instruction set computer (RISC) microprocessors.

CROSS REFERENCE TO ATTACHED APPENDIX

Appendix A contains the following files in one CD-ROM (of which two identical copies are attached hereto), and is a part of the present disclosure and is incorporated by reference herein in its entirety:

```
Volume in drive D is 020329_1606
Volume Serial Number is 2AC6-332D
Directory of d:\
03/29/02 04:06p      <DIR>        .
03/29/02 04:06p      <DIR>        ..
03/28/02 02:31p          365,686  MEMCOP.TXT
03/28/02 02:33p          219,262  UCEXEC.TXT
         4 File(s)       584,948 bytes
                               0 bytes free
```

The files of Appendix A form source code of computer programs and related data of an illustrative embodiment of the present invention.

A uCexec.txt file describes the behavioral model of circuitry in a microcontroller's execution unit to decode and execute an instruction to provide a store-and-load command to a memory co-processor.

A MemCoP.txt file describes the behavioral model of circuitry of the memory co-processor, which is also known as a special processing unit (SPU).

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

In order to support network processing, processors must be able to support a variety of operations such as instructions to interface with coprocessors. As the demand for faster processors rises, hardware acceleration of these operations becomes more and more important. Prior art processors have focused on increasing the speed of execution of individual instructions.

A RISC processor executes multiple instructions to access internal and external memory locations and interface with co-processors, e.g., the LOAD instruction and the STORE instruction. The LOAD instruction reads data from an external storage location or a port of a co-processor to a register of the RISC processor. The STORE instruction writes the content of a RISC processor register to an external storage location or to a port of a co-processor.

In prior art systems, a first instruction of the microcontroller requests data from an external memory address. The microcontroller receives the data. A second instruction performs a calculation on the data. A third instruction writes the modified data back to the external memory address. If multiple tasks and multiple microcontrollers are attempting to access and modify the same data, additional overhead is needed to prevent overlapping memory accesses from corrupting the data. For example, some microcontrollers add the overhead of semaphores to control access to shared data.

Thereby special handling is necessary. One implementation requires the use of semaphores to access shared data. A semaphore is a flag used by one task to inform other tasks that the data is being used by that task.

When dealing with high-speed data networks, there is a need for processors that allow for fast processing of data and communications with co-processors preferably within a single instruction cycle; such processors are not available now.

SUMMARY

Embodiments of the present invention provide an improved processing system and improvements in communications among processors, coprocessors and memory. Specifically, according to the present invention, a method and apparatus provide a single-cycle instruction ("store-and-load") that stores a command to a co-processor (a second processor) to atomically read and modify data located in external memory and that prepares to load resultant data.

Embodiments of the present invention also provide a method of executing a processor instruction in a processor with an associated co-processor, the method including sending a command from the processor to the co-processor, where the command includes a second instruction, executing the second instruction on the co-processor in a single instruction cycle.

Embodiments of the present invention also provide a processing system including a processor, a co-processor connected to the processor, and an external memory connected to the co-processor, wherein the processor sends to the co-processor a command including an instruction, and the co-processor executes the instruction in an instruction cycle.

Embodiments of the present invention also provide a processor with an associated co-processor, the processor including an execution unit, the execution unit including a dedicated control register and the dedicated control register containing an operation mask wherein the operation mask defines active flows and wherein the processor sends to the co-processor the contents of the dedicated control register as a result of a write to the dedicated control register.

The present invention is better understood upon consideration of the detailed description below and the accompanying drawings.

BRIEF DESCRIPTION OF THE DRAWINGS

FIG. 2A illustrates the arguments of a store-and-load instruction on a microcontroller, in accordance with the invention.

FIG. 2B further illustrates the arguments of a store-and-load instruction on a microcontroller, in accordance with the invention.

In the present disclosure, like objects that appear in more than one figure are provided with like reference numerals.

DETAILED DESCRIPTION

Figure 1:
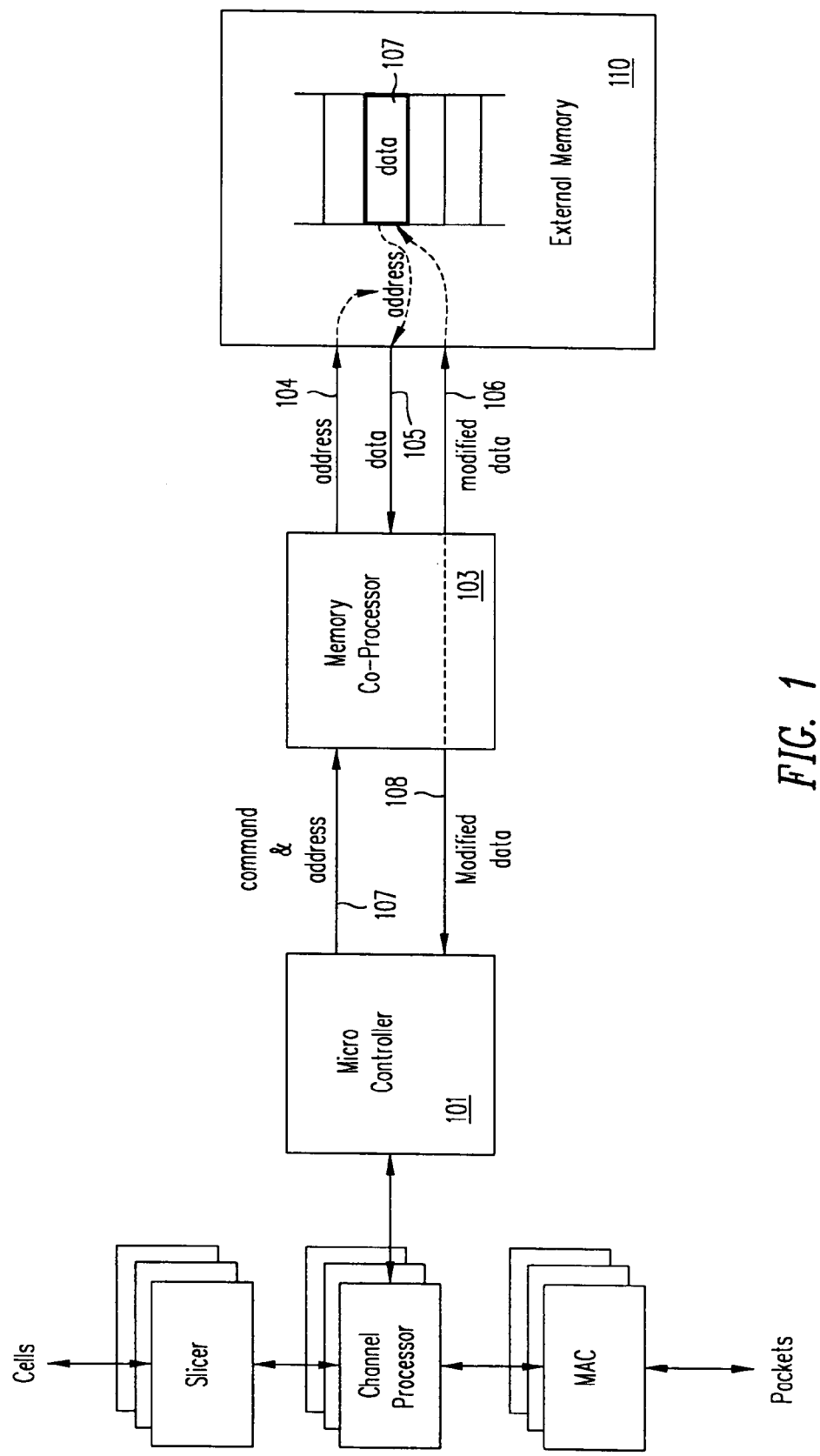
FIG. 1 illustrates, in a block diagram, use of a memory co-processor to interface a microcontroller to external memory, in accordance with the invention.

This document is related to and incorporates by reference herein in their entirety the following U.S. patent application(s):

U.S. patent application Ser. No. 10/103,436 entitled "Dynamic Allocation of Packets to Tasks," Nathan Elnathan et al., filed on Mar. 20, 2002.

U.S. patent application Ser. No. 10/103,393 entitled "Reordering of Out-of-Order Packets," Nathan Elnathan, filed on Mar. 20, 2002.

U.S. patent application Ser. No. 10/103,415 entitled "Asymmetric Coherency Protection," Ilan Pardo, filed on Mar. 20, 2002.

U.S. patent application Ser. No. 10/117,394 entitled "Method and Apparatus to Suspend and Resume on Next Instruction for a Microcontroller," Alexander Joffe, filed Apr. 4, 2002.

U.S. patent application Ser. No. 10/117,779 entitled "Memory Co-Processor for a Multi-Tasking System," Alexander Joffe et al., filed Apr. 4, 2002.

U.S. patent application Ser. No. 10/117,781 entitled "Logic for Synchronizing Multiple Tasks at Multiple Locations in an Instruction Stream," Alexander Joffe et al., filed Apr. 4, 2002.

U.S. patent application Ser. No. 10/117,780 entitled "Sequencing Semaphore," Alexander Joffe et al., filed Apr. 4, 2002.

A microcontroller is a processor on a microchip that, for example, performs arithmetic/logic operations and communicates with other microcontrollers and processors. A microcontroller creates a task to perform a set of instructions. For example, a task may perform processing on a packet, which is a unit of data. To perform processing on a unit of data, the microcontroller may use external memory. A microcontroller may have multiple tasks. External memory may be shared among multiple microcontrollers, each running multiple tasks. A system which uses multiple instructions to access and modify an external memory location requires additional control to avoid collisions among different tasks and different instructions within a task.

By incorporating a memory co-processor, the system gains the attendant advantages. The microcontroller is relieved of much of the burden of accessing and processing various memory mapped memory.

According to the present invention, a microcontroller includes in its instruction set an instruction that issues commands to a memory co-processor. These commands are interpreted and executed on the memory co-processor as atomic instructions. An atomic instruction is one that is performed in whole without possible interruption once the instruction has begun execution.

For example, the Read-Modify-Write (RMW) instruction allows a processor in one atomic operation to: (1) read data from an external storage location or a port of a co-processor; (2) modify or update that data; then (3) write the data back to the external storage location or port. A RMW instruction can be used for multi-task, multiprocessor synchronization.

A variations on the RMW instruction is the exchange memory (XMEM) instruction. The XMEM instruction: (1) loads data from an external storage location to a first register in the RISC processor; and (2) stores data from a second register in the RISC processor to the same external storage location.

The microcontroller can issue commands of different function types to the memory co-processor. In one embodiment, the function types include single policing, dual policing, read-update, read-modify-write and sequencing semaphores.

To account for multiple tasks accessing shared memory, a microcontroller of the present invention issues commands to a memory co-processor instructing the memory co-processor to atomically execute operations on specified external memory.

FIG. 1 illustrates, in a block diagram, use of a memory co-processor to interface a microcontroller to external memory, in accordance with the present invention. A microcontroller 101, which may be a network processor, interfaces to one or more channel processors. Microcontroller 101 also interfaces to a memory co-processor 103. In some implementations, memory co-processor 103 is called a special processing unit (SPU). Memory co-processor 103 provides an interface to external memory 110. Memory co-processor 103 can, for example, execute instructions on data held in external memory. Each store-and-load command sent to memory co-processor 103 is supplied on a bus 102 along with an address 107 of an external memory containing the data on which the command is to be performed. The memory co-processor is further described in detail in the above-described U.S. patent application Ser. No. 10/117,779 entitled "Memory Co-Processor for a Multi-Tasking System," Alexander Joffe et al., that has been incorporated by reference above.

In one embodiment, a "store-and-load" instruction executed on a microcontroller 101 provides a command and an address on bus 102 to memory co-processor 103. Memory co-processor 103 decodes and executes the command atomically. In the processes of executing the command, a request for data at the supplied address is requested across bus 104 to external memory 110. External memory 110 supplies the requested data 105. Memory co-processor 103 can modify the data and save the modified data 106 to external memory 110. Memory co-processor 103 can also forward the modified data 108 to microcontroller 101.

In accordance with the present invention, a STORE & LOAD ("store_load") instruction is introduced.

FIG. 2A illustrates the arguments of a store-and-load instruction on a microcontroller. Instruction operand store-_load 201 identifies the instruction to a programmer and to an assembler that the current instruction is a store-and-load instruction. The instruction includes a source address 202 that is used to identify the location of the data in external memory to be provided to and used by memory co-processor 103. The instruction includes command 203 that is used to identify the command or location of the command to be provided to and executed by memory co-processor 103. The instruction includes a destination 204 that identifies the register or local memory address within microcontroller 101 which the results of command 203 will be stored in once the results are returned by memory co-processor 103.

The instruction can include additional fields 205 such as an increment flag indicating whether source address pointers should be incremented. Field 205 can also include an increment offset used to indicate the step size when incrementing the source address pointer. Field 205 can also included fields used to similarly increment a destination pointer 204. Field 205 can also include a suspend flag as described in U.S. patent application Ser. No. 10/117,394 entitled "Method and Apparatus to Suspend and Resume on Next Instruction for a Microcontroller," Alexander Joffe, incorporated by reference above in its entirety.

FIG. 2B further illustrates the arguments of a store-and-load instruction on a microcontroller. Instruction store_loadx 206 identifies the instruction to a programmer and to an assembler that the current instruction is a store-and-load instruction to operate on external memory. The instruction includes an index to a pointer to an external memory address 207 that is used to identify a pointer that identifies the location of the data in external memory to be provided to and used by memory co-processor 103. The instruction includes the identity of a register pointing to an address containing the command to be performed on external memory 208. The instruction includes the identity of a second register 209 that the modified data will be loaded into once the results are returned by memory co-processor 103. The instruction can include additional fields 210 as described above for additional fields 205.

By sending the store-and-load command to memory co-processor 103, the store-and-load instruction allows microcontroller 101 and its task to offload the control of shared memory. Once memory co-processor 103 begins decoding and executing the store-and-load command sent by microcontroller 101, memory co-processor 103 executes the function in an atomic fashion.

In instances when tasks modify shared data (such as in the read-modify-write scenario), memory co-processor 103 operates atomically on the data without interference from competing tasks. The data contained at the location pointed to by the external memory address is read, modified and saved without interruption. That is, no other microcontroller 101 instruction or memory co-processor 103 instruction is allowed to read the shared data before the data has been modified and sent to external memory 110. Using the store-and-load command thus eliminates uncertainty with the reliability of data held in shared memory and reducing the complexity of microcontroller 101.

Figure 3A:
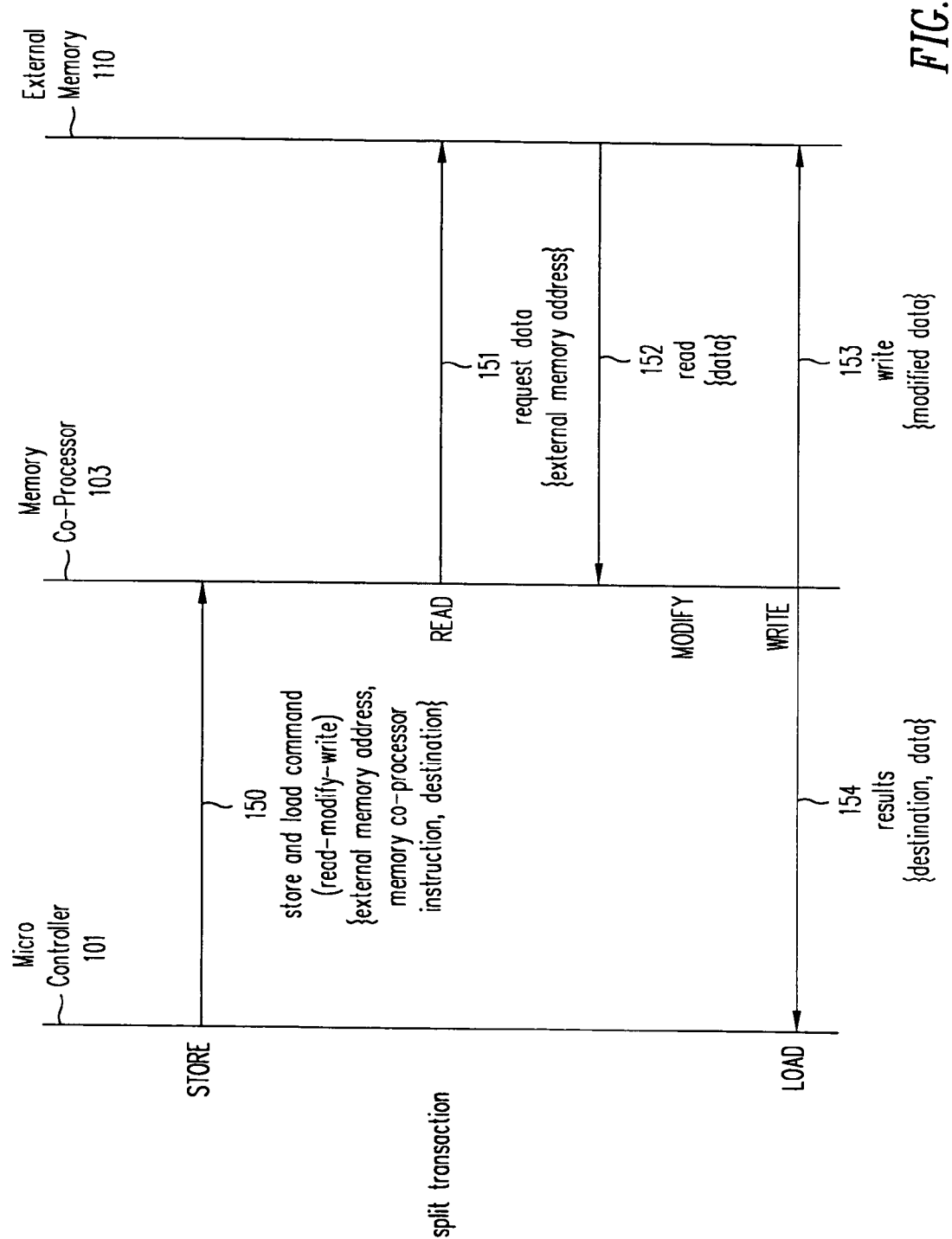
FIG. 3A illustrates messaging and data flow for a store-and-load command of the type read-modify-write among a microcontroller, a memory co-processor and external memory.

FIG. 3A illustrates messaging and data flow for a store-and-load command of the type read-modify-write among a microcontroller, a memory co-processor and external memory. Microcontroller 101 prepares a store-and-load command that has a function type of read-modify-write. Microcontroller 101 stores the store-and-load command 150 to memory co-processor 103.

Memory co-processor 103 decodes the store-and-load command and its embedded arguments. Several arguments can be embedded in store-and-load command 150.

In some implementations, embedded in store-and-load command 150 are memory co-processor function type (FT) (e.g., read-modify-write), operational control (OPC), an operation number (OPN), function parameters (FP) and optional operand(s) specific to the function type.

OPC: Embedded in the store-and-load command is an operational control field. The operational control includes a flag OPC-1 indicating the store-and-load command should be executed by memory co-processor with sequencing disabled or enabled. If sequencing is disabled, memory co-processor 103 executes each store-and-load command on a first-come-first-served basis without delay.

If sequencing is enabled, memory co-processor 103 executes store-and-load commands based on sequence numbers. Each store-and-load command has associated with it a sequence number. An 8-bit sequence number allows for 256 unique sequence number values. A ninth bit allows for an ingress/egress indication. One sequence number value associated with an OPN flow may be shared among multiple store-and-load commands sent to memory co-processor 103 from a task in microcontroller 101. Memory co-processor 103 contains a current sequence number for each OPN flow. An OPN flow is further described below. Additionally, OPN flows are discussed as "synchronization points" in the aforementioned U.S. patent application Ser. Nos. 10/117,781 entitled "Logic for Synchronizing Multiple Tasks at Multiple Locations in an Instruction Stream," Alexander Joffe et al., and No. 10/117,780 entitled "Sequencing Semaphore," Alexander Joffe et al.

For a particular OPN flow, if the sequence number associated with the store-and-load command is the same as the current sequence number contained in memory co-processor 103, the store-and-load command is executed on a first-come-first-served basis without delay. If the sequence numbers differ, memory co-processor 103 holds the store-and-load command until the current sequence number contained in memory co-processor 103 equals the sequence number associated with the store-and-load command.

The operational control includes a flag OPC-0 instructing memory co-processor 103 to increment the current sequence number after execution of the store-and-load command.

OPN: Embedded in the store-and-load command is an operation number. If sequencing is disabled, the store-and-load command is executed on a first-come-first-served basis. If sequencing is enabled, memory co-processor sorts the store-and-load command into OPN flows. Each flow in memory co-processor will have an associated current sequence number. If eight OPN flows are defined, then an operation mask (OM) may contain 8-bits where each bit represents one OPN flow.

The operation number identifies the flow to which the store-and-load command will be directed. As described above, if the current sequence number for the identified flow is equal to the sequence number associated with the store-and-load command, the store-and-load command will be executed on a first-come-first-served basis. If the sequence numbers differ, the store-and-load command will be saved until the flow's current sequence number advances to become equal to the sequence number associated with the store-and-load command.

FP: Embedded in the store-and-load command are function parameters specific to the function type. The function parameters specific to the read-modify-write function type can include an operation size (OS), operand location (OL) and an operation type (OT).

The embedded operand specific to the read-modify-write function identifies details for the modify operation of the read-modify-write function.

OS: The operand can include an operation size which identifies the size of the data to be modified. For example a single-bit field can identify either a 16-bit operation size or a 32-bit operation size.

OL: The operand can also include an operand location identifying the location within the identified external memory address location. For example, if the external memory address points to 64-bit memory and the operand size identifies a 16-bit operand length, the operand location field can identify which portion of the external memory the operand will assume. A 64-bit memory location can be divided into four sequential 16-bit portions. The operand location points to one of these portions. If the operation size is set to 32-bits in a 64-bit memory system, then the operand location identifies the operand as either the most significant 32-bits or least significant 32-bits.

OT: The operand can include an operation type. The operation type informs memory co-processor 103 what type of operation to perform on the identified operand of the data read from the external memory address. The operation type sets the modification function that the memory co-processor will perform. Examples of operation type are 16-bit ADD, 32-bit ADD, 16-bit OR, 16-bit AND, 16-bit XOR, 16-bit INCREMENT and 32-bit INCREMENT.

Memory co-processor 103 begins to execute the embedded read-modify-write instruction. Memory co-processor 103 sends a request for data 151 from external memory 110. Memory co-processor 103 reads the data 152 from external memory 110.

Memory co-processor 103 performs the operation on the identified data then writes the modified data 153 back to the location pointed to by the external memory address in external memory 110. Memory co-processor 103 also sends the modified data as results 154 back to microcontroller 101. Microcontroller 101 receives results 154 and loads the designated register of the task originally issuing the store-and-load command.

Figure 3B:
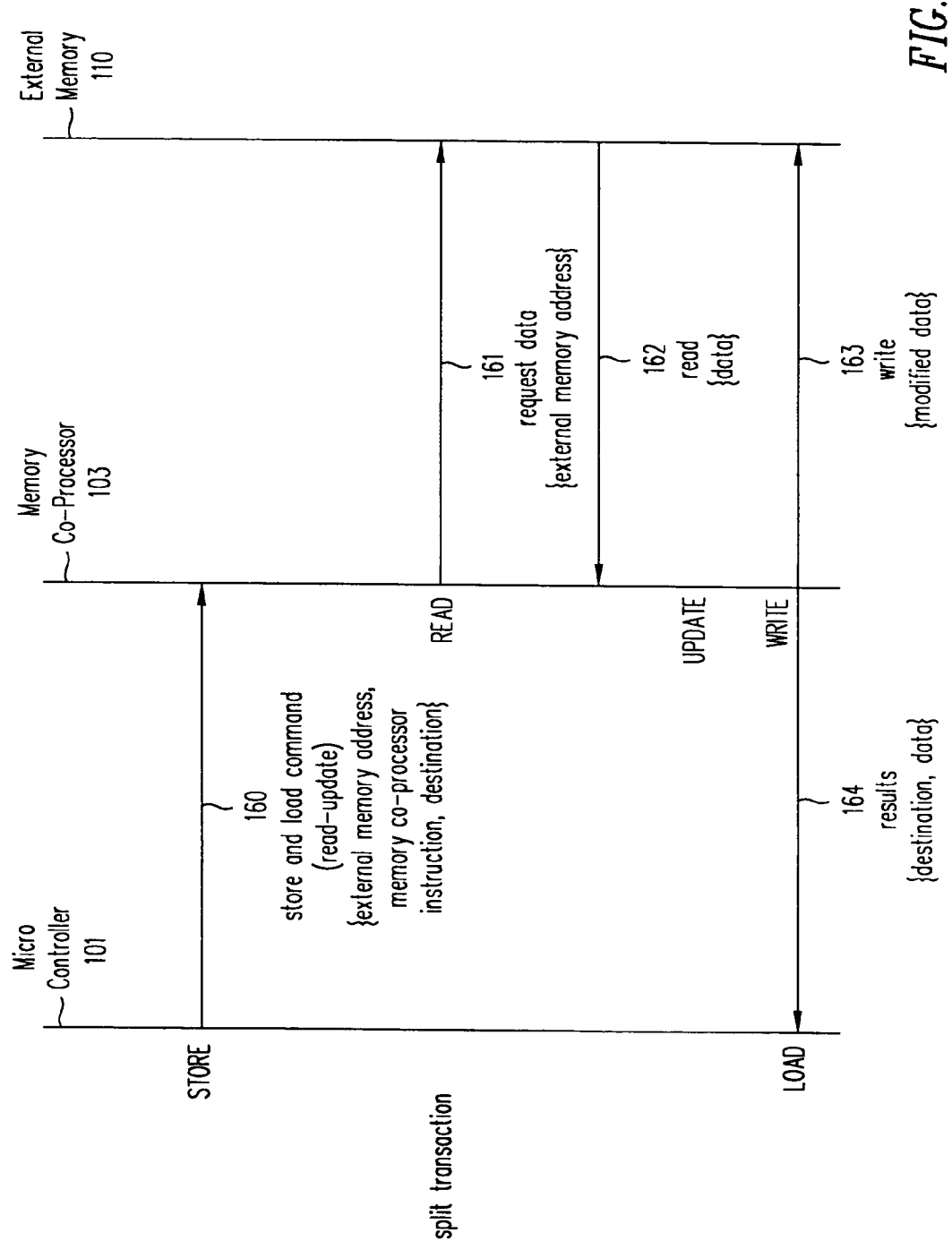
FIG. 3B illustrates messaging and data flow for a store-and-load command of the type read-update among a microcontroller, a memory co-processor and external memory.

FIG. 3B illustrates messaging and data flow for a store-and-load command of the type read-update among a microcontroller, a memory co-processor and external memory. Microcontroller 101 prepares a store-and-load command that has a function type of read-update. Microcontroller 101 stores the store-and-load command 160 to memory co-processor 103.

Memory co-processor 103 decodes the store-and-load command and its embedded arguments. Several arguments can be embedded in store-and-load command 160.

In some implementations, embedded in store-and-load command 160 are memory co-processor function type (FT) (e.g., read-update), operational control (OPC) flags as described above, an operation number (OPN) as described above, function parameters (FP) and optional operand(s) specific to the function type.

FP: Embedded in the store-and-load command are function parameters specific to the function type. The function parameters specific to the read-update function type include an operation type (OT).

OT: The operand can include an operation type. The operation type informs memory co-processor 103 whether to perform a read-alone or a read-and-update.

Memory co-processor 103 begins to execute the embedded read-update instruction. Memory co-processor 103 sends a request for data 161 from external memory 110. Memory co-processor 103 reads the data 162 from external memory 110.

If the operation type flag indicates a read-alone, memory co-processor 103 provides the data read as the results 164 passed to microcontroller 101 but does not write the unmodified data back to external memory 110.

If the operation type flag indicates a read-and-update, memory co-processor 103 provides the data read as the results 164 passed to microcontroller 101 and replaces the data stored in external memory 110 with the 16-bit value embedded in the optional operand field of the store-and-load command.

Microcontroller 101 receives results 164 and loads the designated register of the task originally issuing the store-and-load command.

Figure 3C:
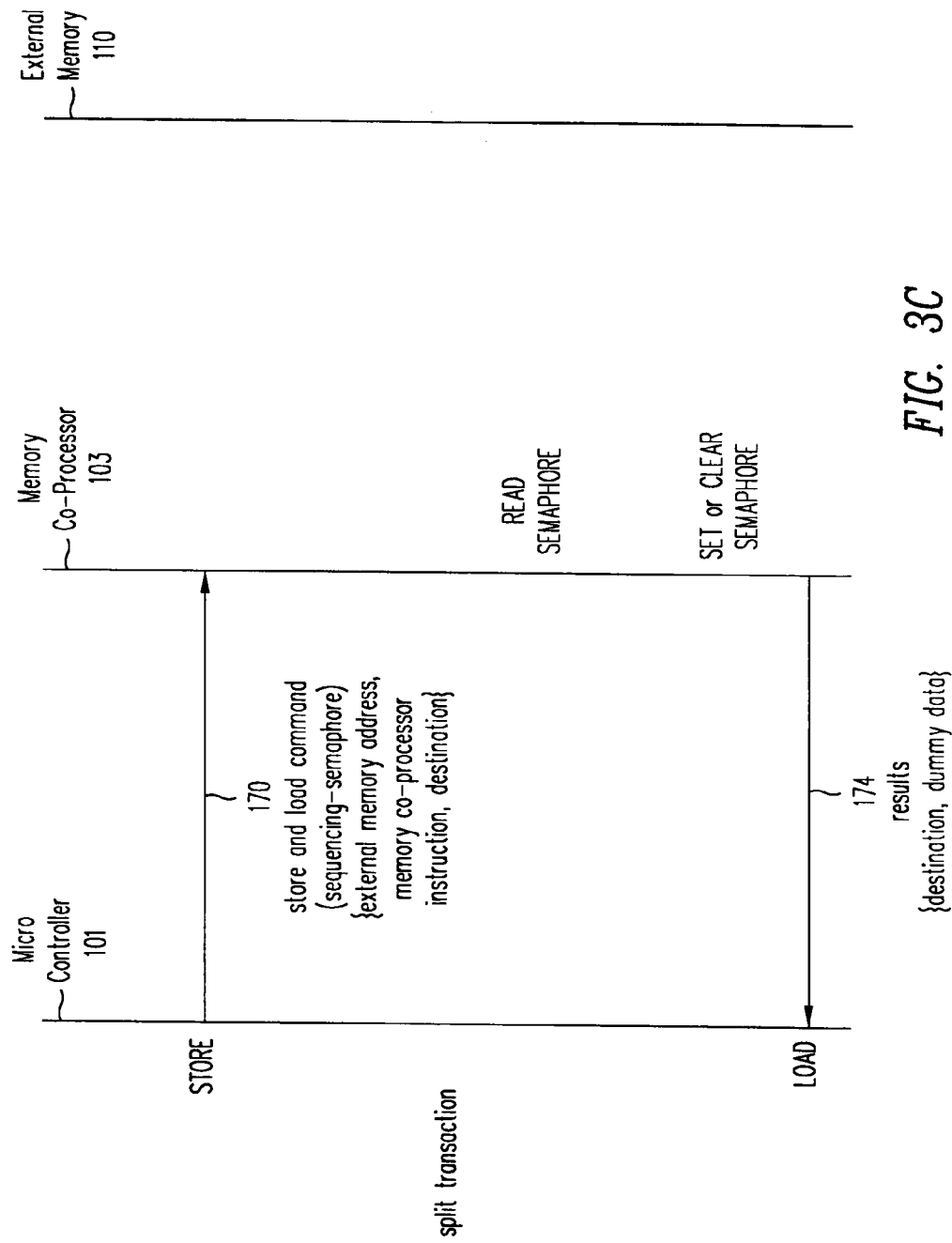
FIG. 3C illustrates messaging and data flow for a store-and-load command of the type sequencing-semaphore among a microcontroller, a memory co-processor and external memory.

FIG. 3C illustrates messaging and data flow for a store-and-load command of the type sequencing-semaphore among a microcontroller, a memory co-processor and external memory. Microcontroller 101 prepares a store-and-load command that has a function type of sequencing-semaphore. Microcontroller 101 stores the store-and-load command 170 to memory co-procssor 103.

Memory co-processor 103 decodes the store-and-load command and its embedded arguments. Several arguments can be embedded in store-and-load command 170.

In some implementations, embedded in store-and-load command 170 are memory co-processor function type (FT) (e.g., sequencing-semaphore), operational control (OPC) flags as described above, an operation number (OPN) as described above, function parameters (FP) and optional operand(s) specific to the function type.

FP: Embedded in the store-and-load command are function parameters specific to the function type. The function parameters specific to the sequencing-semaphore function type include an operation type (OT).

OT: The function parameters can include an operation type. The operation type informs memory co-processor 103 whether to perform a get-semaphore or a release-semaphore. To get a semaphore, OPC-1 must be enabled and OPC-0 must be disabled. To release a semaphore, both OPC-1 and OPC-0 must be enabled.

Memory co-processor 103 begins to execute the embedded sequencing-semaphore instruction. In some implementations, memory co-processor 103 includes internal memory that acts as a semaphore back. In some implementations, memory co-processor 103 has cache that holds the most recently modified external data, including semaphores.

If the operation type is a get-semaphore, memory co-processor compares the current sequence number of the OPN flow and the sequence number associated with the store-and-load command. If the sequence numbers are not equal, then the get-semaphore request is held in a buffer until the sequence numbers become equal. If the sequence numbers are equal or when the sequence numbers become equal, memory co-processor 103 sends dummy data in the results 174 to microcontroller 101.

If the operation type is a release-semaphore, memory co-processor 103 increments the current sequence number of the requested OPN flow. After the increment, the new current sequence number will cause a result 174 with dummy data to be sent back to a task in Microcontroller 101 if that task has a pending get-semaphore request in the OPN flow with a sequence number equal to the new current sequence number.

Microcontroller 101 will wake and resume a suspended task if that task receives results 174 message. The microcontroller task may be asleep as a result of a store_loadx instruction with a suspend-flag set as describe above.

In all cases, the result dummy data in results 174 is all zeros and is just intended to wake a suspended task on microcontroller 101.

Figure 4:
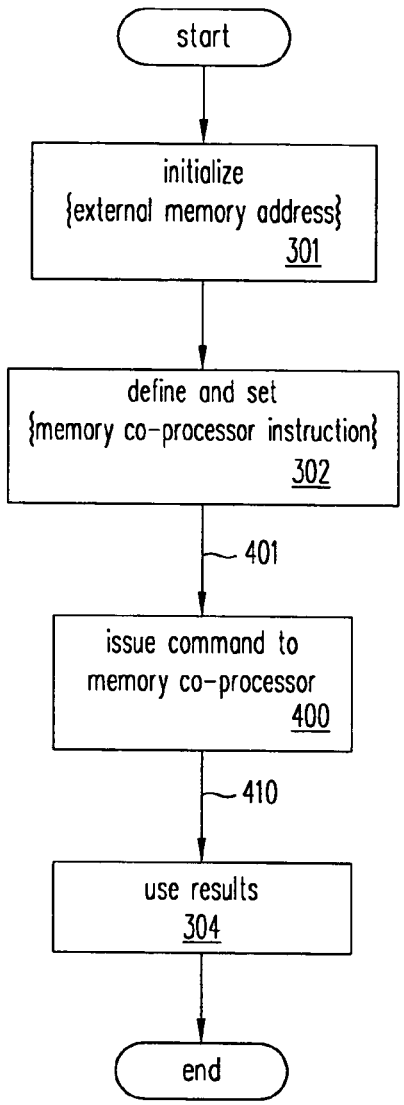
FIG. 4 illustrates an example of steps to execute before and after a store-and-load instruction on a microcontroller.

FIG. 4 illustrates an example of steps to execute before and after a store-and-load instruction on a microcontroller. In some embodiments, after assembly microcontroller 101 executes assembly language instructions 300 of the syntax shown. The source register containing external memory address is initialized 301. The command that includes a memory co-processor instruction is defined and set 302.

After 301 and 302 initialization, microcontroller 10 executes the store_loadx instruction which issues 400 the command to memory co-processor 400. The store_loadx instruction can include flags to suspend after execution. If a suspend flag is set, the task will suspend at the completion of execution of the store_loadx instruction, i.e., just after 400. If the suspend-flag is not set, execution continues normally.

The store_loadx instruction that directs the actions of memory co-processor 103 can include parameters to instantiate a sequenced store_loadx operation to a particular OPN flow and sequence number. The OPN and OPC sequencing parameters are described above. The example shown in 300 instantiates an un-sequenced store_loadx instruction. To instantiate a sequenced store_loadx, an OPN flow must be declared. A declare operation can be performed by writing to a dedicated SPU register within the execution unit's special registers. A declare operation can also be performed by issuing a store_loadx instruction with the declare bit set and the OM field set to define active OPN flows. See above referenced U.S. patent application Ser. Nos. 10/117,781 entitled "Logic for Synchronizing Multiple Tasks at Multiple Locations in an Instruction Stream," Alexander Joffe et al., and No. 10/117,780 entitled "Sequencing Semaphore," Alexander Joffe et al., for a further description of the declare operation.

If the suspend-flag is not set, execution continues normally. The task may use the results 304. The example shows the register defined in the store_loadx command shall be moved to another register. If during execution of the move instruction the register (R1) does not yet contain the data as determined by examining the associated dirty-bit, the task will be suspended until the results are returned from memory co-processor 103. The dirty-bit is further described in U.S. patent application Ser. No. 10/117,394 entitled "Method and Apparatus to Suspend and Resume on Next Instruction for a Microcontroller," Alexander Joffe.

Figure 5:
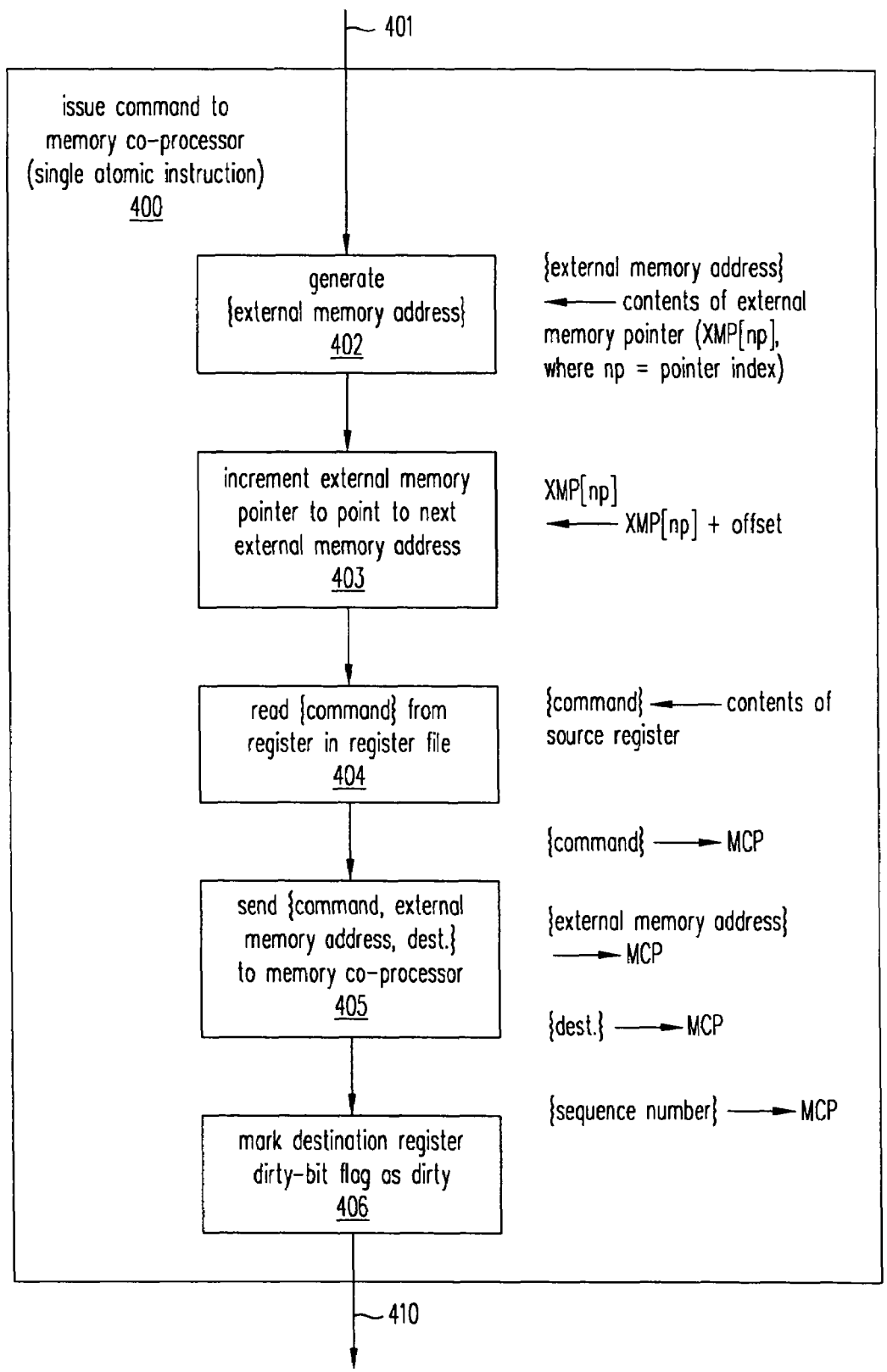
FIG. 5 illustrates an example of steps performed in executing a store-and-load instruction on a microcontroller.

FIG. 5 illustrates an example of steps performed in executing a store-and-load instruction on a microcontroller. In some implementations, when executing the store_loadx instruction, microcontroller performs the following steps. At step 402 microcontroller 101 generates the external memory address. At step 403 invoked after step 402, microcontroller 101 increments the external memory pointer such that the pointer points to the next external memory address. At step 404, microcontroller 101 reads the command from the source register. Next at step 405, microcontroller 101 sends the information to memory co-processor 103. Microcontroller 101 can send the information to memory co-processor 103 by placing the command on the data bus, placing the external memory address on the external memory address bus, placing the destination on the destination bus and sequence number on the sequence number bus as depicted in FIG. 11C. At step 406, microcontroller 101 sets the dirty-bit for the destination register to indicate that the destination register is waiting for a response from memory co-processor 103. Additionally, if the suspend-flag is set, microcontroller 101 suspends the task.

Figure 6:
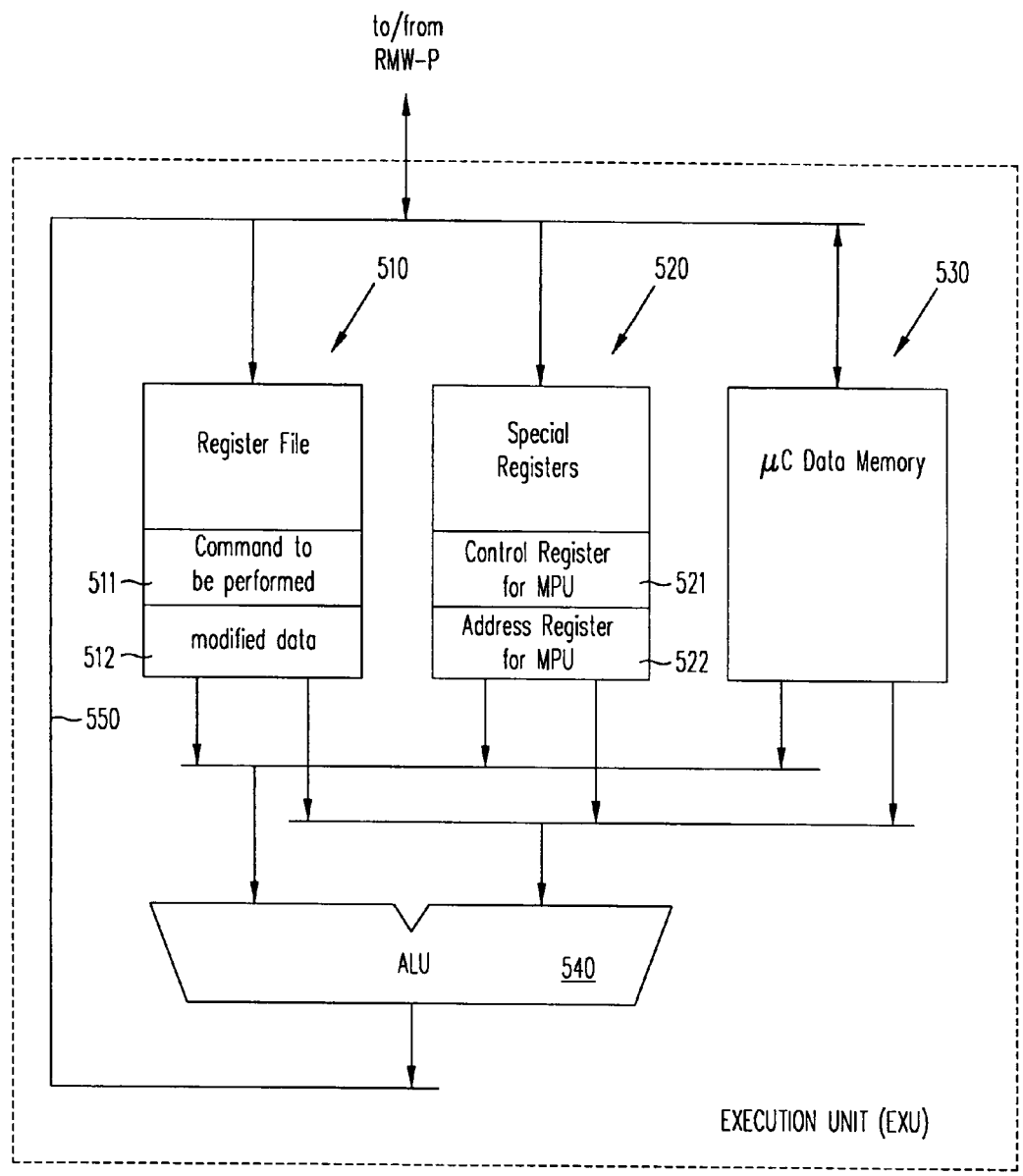
FIG. 6 illustrates a block diagram of an execution unit of a microcontroller.

FIG. 6 illustrates a block diagram of an execution unit of a microcontroller. An execution unit (EXU) executes instructions such as the store_loadx instruction. The EXU resides in microcontroller 101. The EXU includes a register file (RF) 510, a special register (SP) 520, microcontroller data memory (DM) 530, and an arithmetic logic unit (ALU) 540. RF 510 includes general purpose registers such as registers assigned to contain the command to be performed 511. RF 510 also includes the register holding modified data 512 resulting from the execution of the store_loadx instruction. SP 520 includes a control register dedicated to hold the sequencing operation mask (OM) described above. SP 520 also includes external memory address pointers (XMP0 & XMP1) and internal memory address pointers (IMP0 & IMP 1). For a further description of the EXU see U.S. patent application Ser. No. 10/103,394 entitled "Method and Apparatus to Suspend and Resume on Next Instruction for a Microcontroller," Alexander Joffe.

Figure 7A:
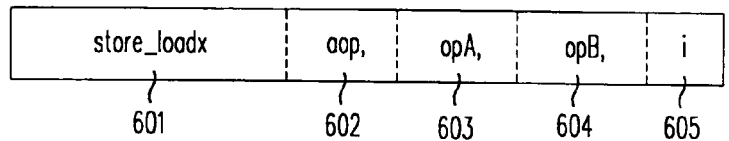
FIG. 7A illustrates operands of a store-and-load instruction.

FIG. 7A illustrates operands of a store-and-load instruction. In some implementations, a store_loadx 601 instruction includes an aop 602, opA 603, opB 604 and a increment i-flag 605.

Figure 7B:
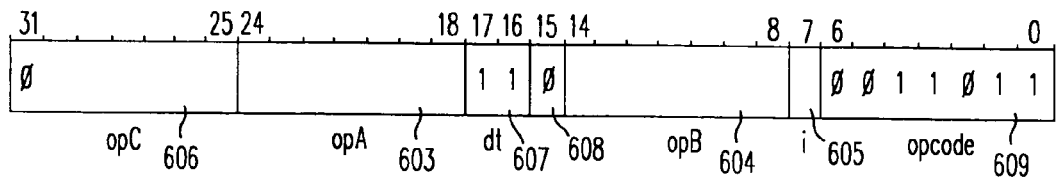
FIG. 7B illustrates an assembled store-and-load instruction according to some embodiments of the present invention.

FIG. 7B illustrates an assembled store-and-load instruction according to some embodiments of the present invention. In some implementations, a store_loadx instruction in program memory occupies 32 bits and is defined as follows:

opC 606 (bits 31 . . . 25) Operand C: lower 7 bits of aop where the most significant bit (bit 31) is not used and set to 0; bit 30 indicates which external memory pointer to use (XMP0 or XMP1); bit 29 is the DST bit and is set to 1 for a store_loadx instruction; bits 28 . . . 25 is the byte addressing mode and is set to '1111' for a store_loadx instruction.

opA 603 (bits 24 . . . 18) Operand A:

dt 607 (bits 17 . . . 16) Destination bits: directs the data to external memory mapped device (i.e., SPU) and is set to '11' for a store_loadx instruction.

608 (bit 15): reserved bit set to '0'.

opB 604 (bits 14 . . . 8) Operand B: contains the general purpose register identification containing the command to be performed.

i-flag 605 (bit 7) Index: flag to indicate whether the external memory pointer (XMP0 or XMP1 as designated by bit 30 (opC). If the bit is set, following access, the external memory pointer is advanced to the next external memory location.

609 (bits 6 . . . 0): Opcode that identifies the instruction (e.g., store_loadx)

Figure 7C:
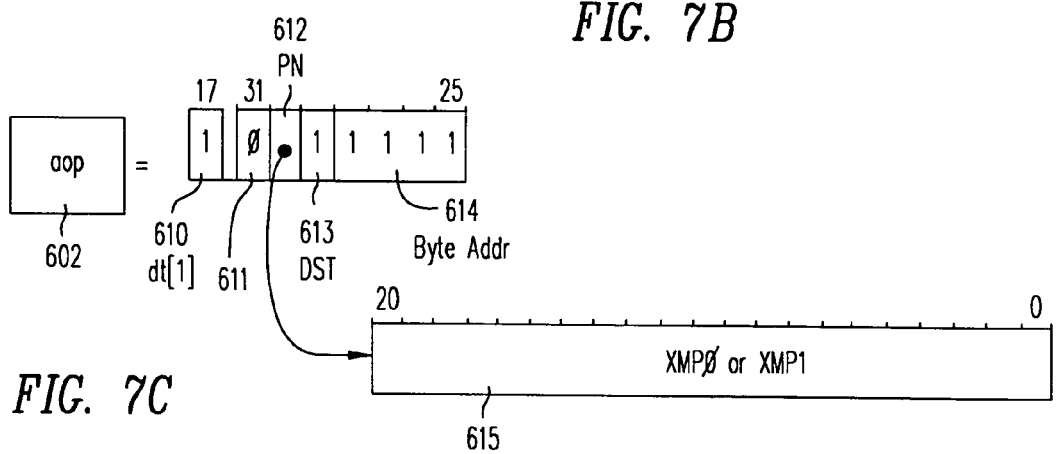
FIG. 7C illustrates an address operand.

FIG. 7C illustrates an address operand. Aop 602 provided in the instruction instantiation is used to generate dt and opC. Aop 602 is a concatenation of the most significant bit of dt 607 (dt[1]) and of opC 606 defined above.

Figure 7D:
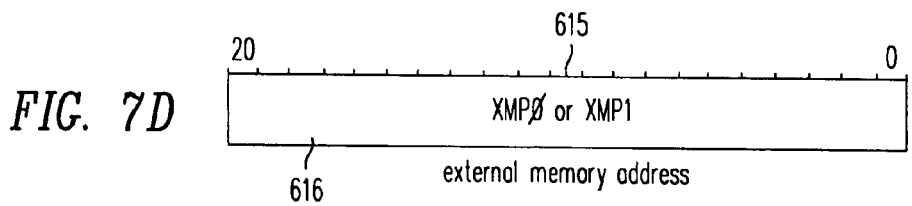
FIG. 7D illustrates an external memory address.

FIG. 7D illustrates an external memory address. External memory address pointer 616 is a 21-bit address. Depending on PN 612 of opC 606, either XMP0 or XMP1 is used.

Figure 7E:
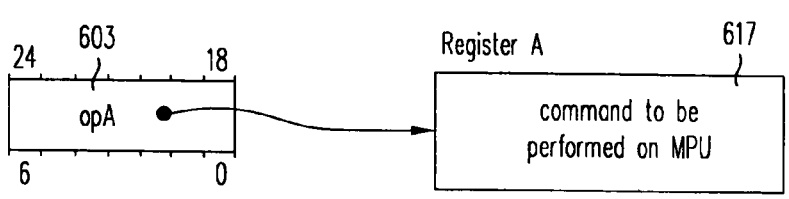
FIG. 7E illustrates a pointer to a register containing a command.

FIG. 7E illustrates a pointer to a register containing a command. OpA 603 contains an identifier to an RF register 617. Before execution of the store_loadx instruction, the identified RF register 617 must be filled with the command to be performed on the memory co-processor (also called MPU or SPU).

In some implementations, the command is sent to an SPU across a 64-bit data bus.

Figure 7F:
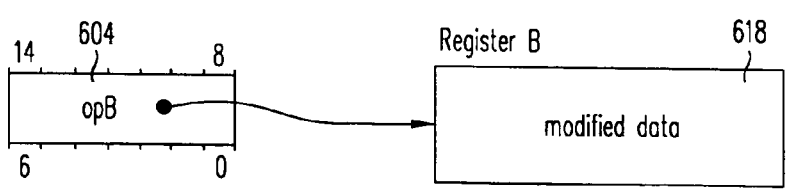
FIG. 7F illustrates a pointer to a destination register

FIG. 7F illustrates a pointer to a destination register. OpB 604 contains an identifier to an RF destination register 618. After execution of the store_loadx instruction, the identified RF destination register 618 is destined to be filled with the modified data generated by memory co-processor based on execution of the command performed on the memory co-processor. Once memory co-processor 103 returns the results destination register 618 will be filled.

Figure 8:
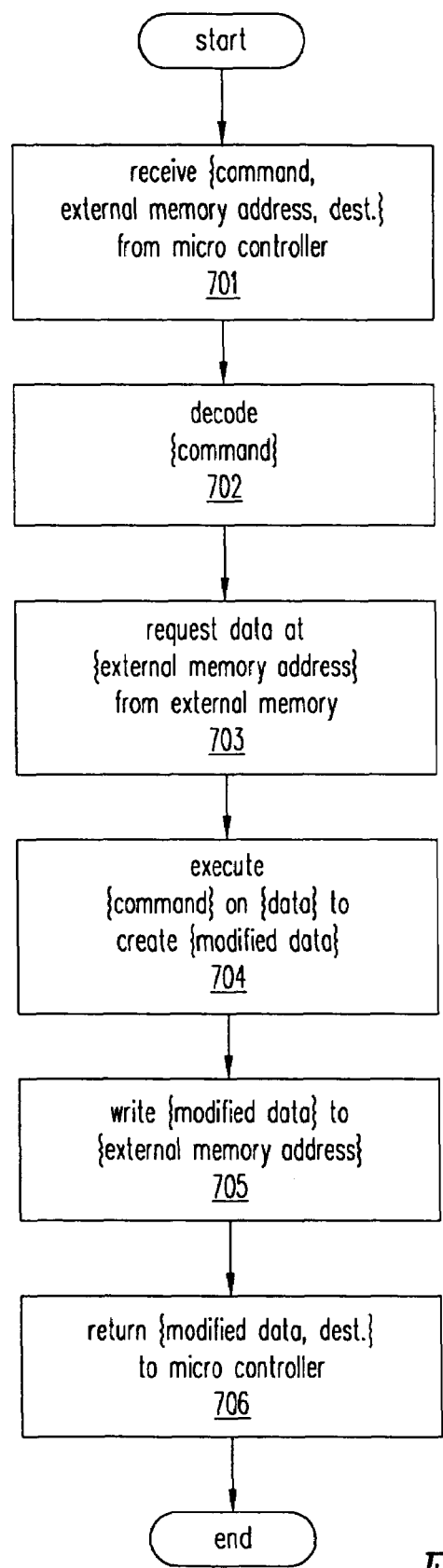
FIG. 8 illustrates execution of a store-and-load command of type read-modify-write on a memory co-processor.

FIG. 8 illustrates execution of a store-and-load command of type read-modify-write on a memory co-processor. Memory co-processor 103 performs several steps when executing the command sent by microcontroller 101.

In step 701, memory co-processor 103 receives the information from microcontroller 101. The information includes the external memory address and destination information.

In step 702, memory co-processor 103 decodes the command.

In step 703, memory co-processor 103 requests data from external memory if the command requires access to external memory.

In step 704, for a read-modify-write function or a read-update function, memory co-processor 103 executes the command on the received data to create modified data.

In step 705, memory co-processor 103 writes the results back to external memory.

In step 706, memory co-processor 103 sends the modified data to microcontroller 101.

Figure 9:
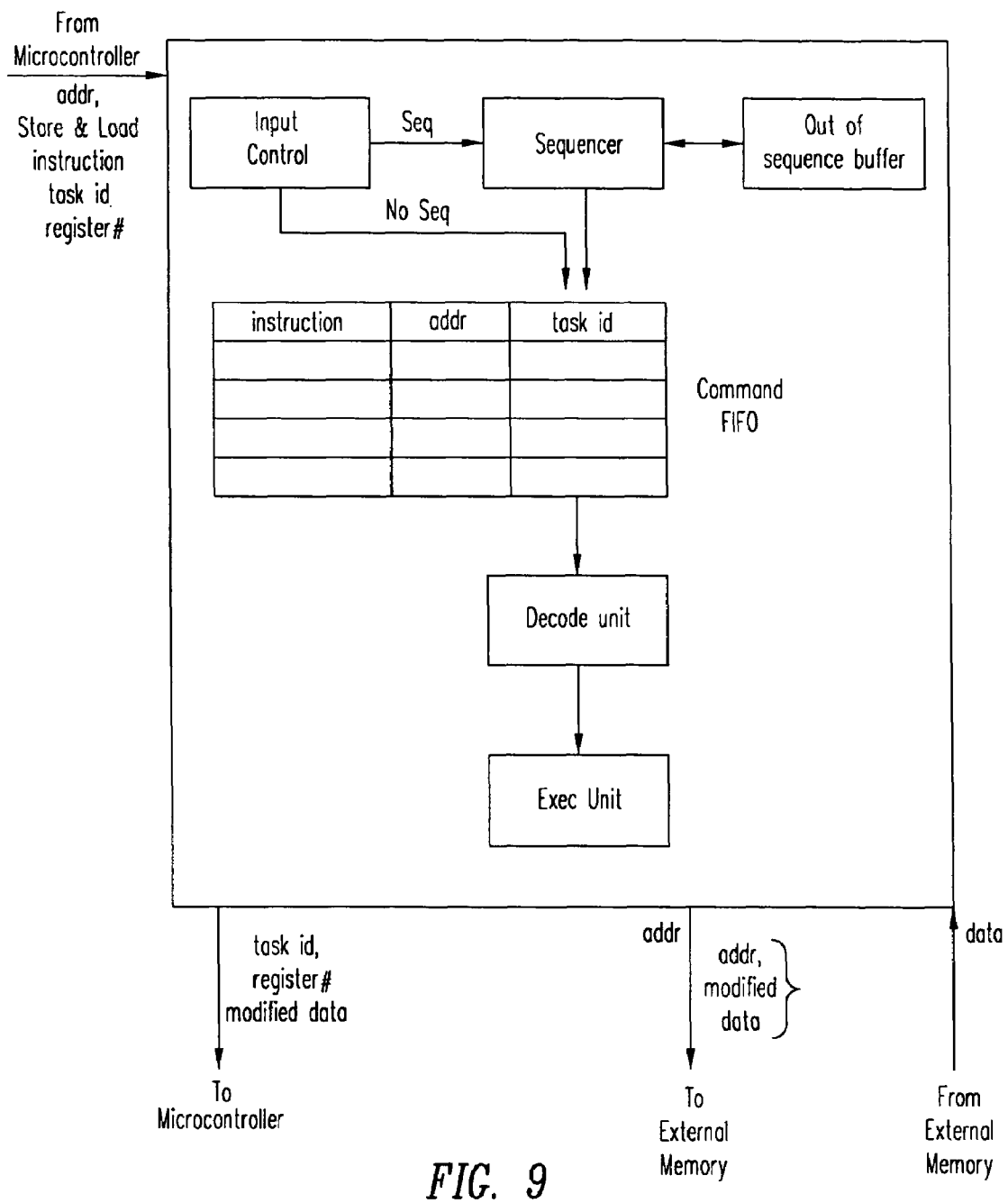
FIG. 9 illustrates a block diagram of a memory co-processor.

FIG. 9 illustrates a block diagram of a memory co-processor. The memory co-processor is further described in U.S. patent application Ser. Nos. 10/117,779 entitled "Memory Co-Processor for a Multi-Tasking System," Alexander Joffe et al., No. 10/117,781 entitled "Logic for Synchronizing Multiple Tasks at Multiple Locations in an Instruction Stream," Alexander Joffe et al., and No. 10/117,780 entitled "Sequencing Semaphore," Alexander Joffe et al.

Figure 10:
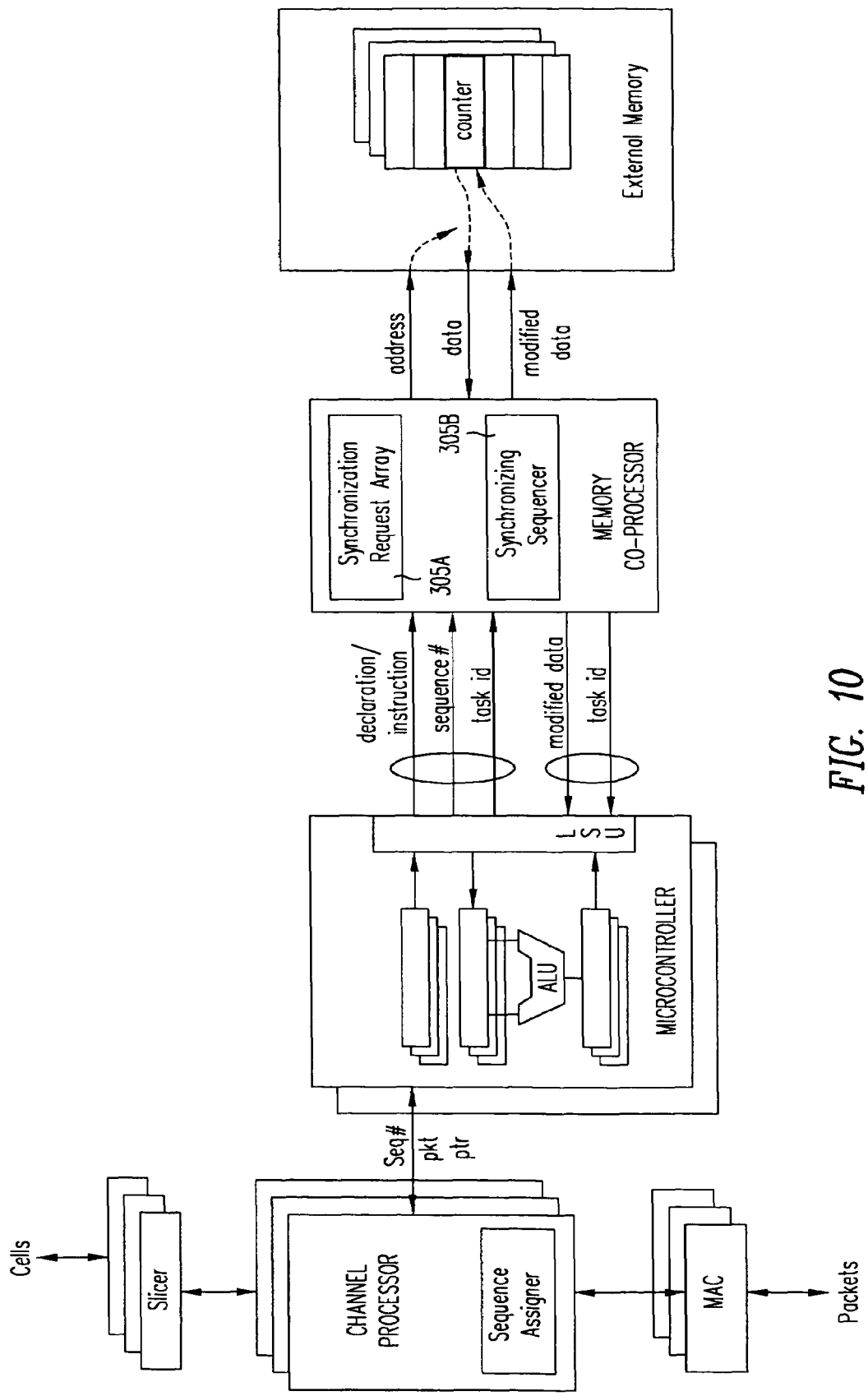
FIG. 10 illustrates a block diagram of a system implementing sequence processing.

FIG. 10 illustrates a block diagram of a system implementing sequence processing. The diagram of a system implementing sequence processing is further described in U.S. patent application Ser. Nos. 10/117,779 entitled "Memory Co-Processor for a Multi-Tasking System," Alexander Joffe et al., No. 10/117,781 entitled "Logic for Synchronizing Multiple Tasks at Multiple Locations in an Instruction Stream," Alexander Joffe et al., and No. 10/117,780 entitled "Sequencing Semaphore," Alexander Joffe et al.

Figure 11A:
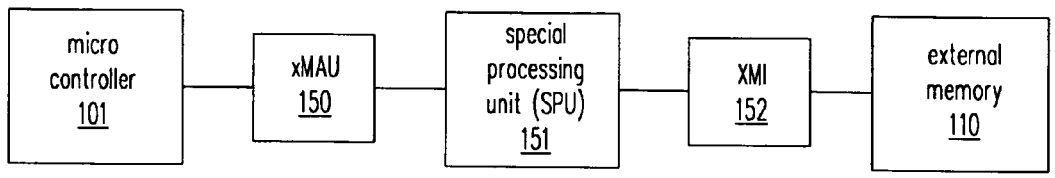
FIG. 11A illustrates interface modules between a microcontroller and a special processing unit and between a special processing unit (SPU) and external memory.

FIG. 11A illustrates interface modules between a microcontroller and a special processing unit and between a special processing unit (SPU) and external memory. In some implementations, microcontroller 101 communicates with special processing unit 151 (SPU) (also called memory co-processor 103) by way of an external memory access unit (XMAU) 150. xMAU 150 is a switching network that allows multiple microcontrollers 101 to communicate with multiple SPUs 151. SPU 151 connects to external memory 110 by way of an external memory interface (XMI) 152. XMI 152 can be capable of interfacing with various memory types, e.g., ZBT.

Figure 11B:
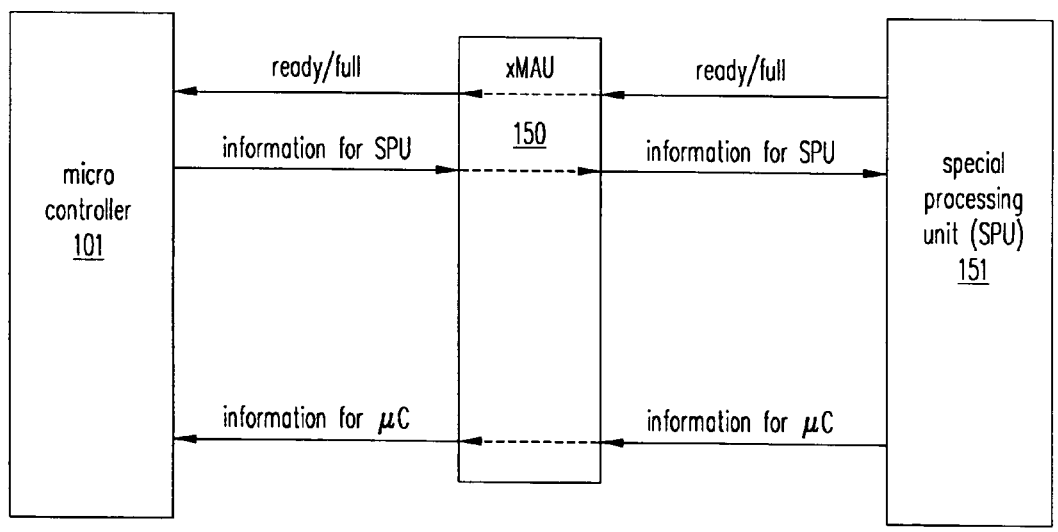
FIG. 11B illustrates signalling between a microcontroller and an xMAU and between an xMAU and a SPU.
Figure 11C:
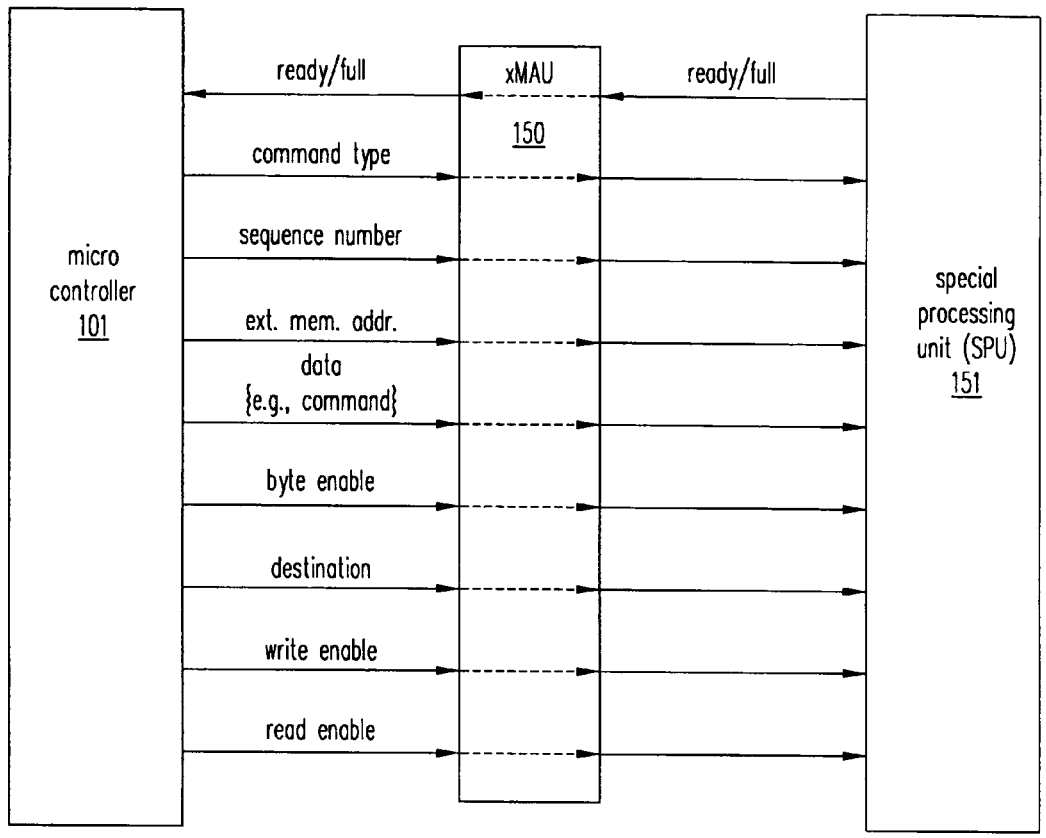
FIG. 11C illustrates signalling from a microcontroller to an xMAU to a SPU.
Figure 11D:
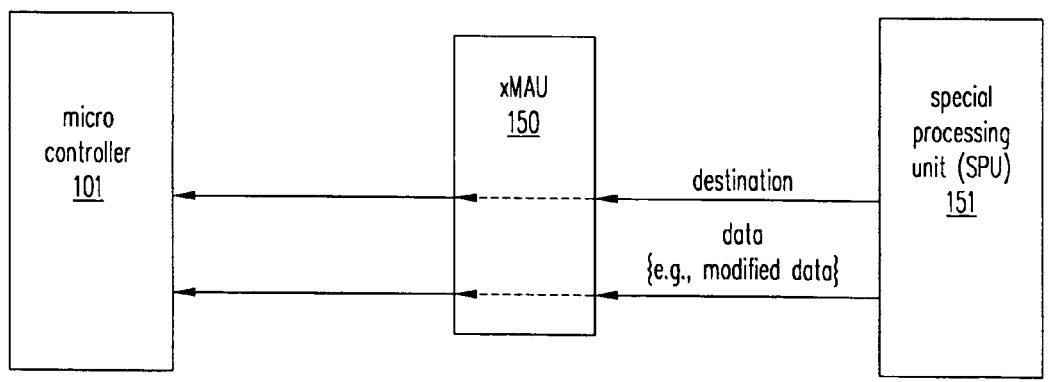
FIG. 11D illustrates signalling from a SPU to an xMAU to a microcontroller.

FIG. 11B illustrates signalling and control between a microcontroller and an xMAU and between an xMAU and a SPU. In some embodiments, microcontroller 101 passes information to SPU 151 by way of hardware busses switched via xMAU 150. Similarly, SPU 151 passes information to microcontroller 101 by way of hardware busses switched via xMAU 150. The information, for SPU 151 is shown in FIG. 11C. The information for microcontroller (uC) 101 is shown in FIG. 11D. SPU 151 provides a ready/full indication to the XMAU 150 which passes the ready/full signal to microcontroller 101. The ready/full control signal indicates whether the bus signals are ready or full.

FIG. 11C illustrates signalling from a microcontroller to an xMAU to a SPU. In some embodiments, microcontroller 101 passes information to xMAU 150 by way of hardware busses. XMAU 150 passes the information directly to SPU 151 on busses extending to SPU 151. In some embodiments the information provided on the busses includes, a command type, a sequence number, an external memory address, data, a byte enable word, a destination, a write enable flag and a read enable flag. 151.

a command type: (1-bit) Set to either normal for communication through the SPU or to SPU for communication directed to the SPU.

sequence number: (9-bits) One bit to indicate egress or ingress and 8 bits to hold a sequence number between 0 and 255.

external memory address: (21-bits) Location of data in external memory data: (64-bits) for SPU command type, the data contains the conunand to be performed. The most significant bit (bit 63) contains a flag to indicate if the command type is a byte enable word: (8-bit) identifies number and location of bytes to process.

destination: (9 to 13 bits) identifies the microcontroller identification number, task identification number, and destination register for the resultant data.

write enable flag: set to one for store-and-load read enable flag: set to one for store-and-load FIG. 11D illustrates signalling from a SPU to an xMAU to a microcontroller. In some embodiments, SPU 151 returns information to xMAU 150 by way of hardware busses. XMAU 150 passes the information directly to microcontroller 101 on busses extending to microcontroller 101. In some embodiments the information provided on the busses includes, a destination and data.

destination: (9 to 13 bits) identifies the microcontroller identification number, task identification number, and destination register for the resultant data. The destination is originally provided by microcontroller 101.

data: resultant data generated by SPU 151 or fetched from external memory.

The above detailed descriptions are provided to illustrate specific embodiments of the present invention and are not intended to be limiting. Numerous modifications and variations within the scope of the present invention are possible. The present invention is defined by the appended claims.

We claim:

1. A memory accessing method comprising:
   (1) executing a first instruction by a first processor, the first instruction specifying an address of a memory location and an operation to be performed on the memory location;
   wherein executing the first instruction comprises the first processor sending information to a co-processor, the information specifying the address of the memory location and the operation to be performed;
   wherein the first processor executes the first instruction without performing the operation and without accessing the memory location;
   (2) performing the operation by the co-processor;
   wherein the memory location is in a memory and the first processor executes the first instruction without accessing the memory;
   the first processor sends the information to the co-processor via a first interface directly connected to the first processor and the co-processor but not to the memory; and
   performing the operation by the co-processor comprises the co-processor accessing the memory via a second interface directly connected to the co-processor and the memory but not to the first processor.

2. The method of claim 1 further comprising, after executing the first instruction, executing additional instructions by the first processor without waiting for the co-processor to perform the operation.

3. The method of claim 1 further comprising the co-processor providing a result of the operation to the first processor, wherein the first processor executes additional instructions without waiting for the result.

4. The method of claim 1 wherein the first processor is operable to execute any number of instructions after the first instruction regardless of a state of the co-processor in performing the operation.

5. The method of claim 1 wherein the first instruction is executed on behalf of a task, and the first instruction specifies whether or not the task is to be suspended at a completion of the execution of the first instruction.

6. The method of claim 1 wherein performing the operation by the co-processor comprises the co-processor modifying data stored at the memory location.

7. The method of claim 6 wherein modifying the data comprises performing at least one of operations ADD, INCREMENT, OR, AND or XOR on the data.

8. The method of claim 7 wherein modifying the data consists essentially in performing an operation ADD, INCREMENT, OR, AND or XOR on the data.

9. The method of claim 6 wherein performing the operation by the co-processor comprises the co-processor providing the modified data to the first processor.

10. The method of claim 1 wherein performing the operation by the co-processor comprises the co-processor reading data stored at the memory location and providing the data to the first processor.

11. The method of claim 10 wherein the first instruction specifies update data to be written to the memory location, and performing the operation by the co-processor comprises the co-processor writing the update data to the memory location.

12. The method of claim 1 wherein the first instruction specifies a destination for a result of the operation, and the co-processor provides the result to the destination.

13. The method of claim 12 wherein the destination is a register of the first processor.

14. The method of claim 12 wherein the destination is within a memory.

15. The method of claim 12 wherein the first instruction specifies whether or not the first processor must increment a pointer to the destination.

16. The method of claim 12 wherein the first processor marks the destination as dirty when executing the first instruction.

17. The method of claim 1 wherein the first instruction specifies whether or not the first processor must increment the address.

18. The method of claim 1 wherein the co-processor performs the operation in a single instruction cycle.

19. A memory accessing method comprising:
   (1) executing a first instruction by a first processor, the first instruction specifying an address of a memory location and an operation to be performed on the memory location;
   wherein executing the first instruction comprises the first processor sending information to a co-processor, the information specifying the address of the memory location and the operation to be performed;
   wherein the first processor executes the first instruction without performing the operation and without accessing the memory location;
   (2) performing the operation by the co-processor;
   wherein the first processor executes a plurality of tasks, executing the first instruction comprises the first processor specifying to the co-processor a task executing the first instruction, and performing the operation by the co-processor comprises the co-processor specifying the task to the first processor.

20. The method of claim 19 wherein the first processor suspends the task upon executing the first instruction, and the first processor wakes up the task when the co-processor has performed the operation.

21. The method of claim 19 wherein the first instruction specifies whether or not the task is to be suspended by the first processor until the co-processor has performed the operation.

22. A memory accessing method comprising:
   (1) executing a first instruction by a first processor, the first instruction specifying an address of a memory location and an operation to be performed on the memory location;
   wherein executing the first instruction comprises the first processor sending information to a co-processor, the information specifying the address of the memory location and the operation to be performed;
   wherein the first processor executes the first instruction without performing the operation and without accessing the memory location;
   (2) performing the operation by the co-processor;
   wherein the first instruction is one of a plurality of first instructions executed by one or more processors comprising the first processor, each first instruction specifying an address of an associated memory location and an associated operation to be performed on the associated memory location;
   wherein the execution of each of the first instructions comprises the one or more processors sending associated information to the co-processor, the associate information specifying to the co-processor the associated address and the associated operation;
   wherein the one or more processors execute the first instructions without performing the associated operations and without accessing the associated memory locations;

wherein the associated operations are performed by the co-processor;

wherein one or more of the first instructions are each associated with a sequence number, and the one or more of the first instructions each specify whether sequencing is enabled or disabled;

wherein if the sequencing is disabled, the co-processor performs the associated operations in an order in which the co-processor receives the first instructions;

wherein if the sequencing is enabled, the co-processor performs each associated operation only when a current sequence number maintained by the co-processor becomes equal to the sequence number associated with the first instruction associated with the operation.

23. An apparatus comprising a first processor for executing computer instructions, the first processor comprising circuitry for executing a first instruction, the first instruction specifying an address of a memory location and an operation to be performed on the memory location;

wherein executing the first instruction comprises the first processor sending information to a co-processor, the information specifying the address of the memory location and the operation to be performed;

wherein the first processor executes the first instruction without performing the operation and without accessing the memory location;

the apparatus further comprising the co-processor, the memory, a first interface directly connected to the first processor and the co-processor but not to the memory, and a second interface directly connected to the co-processor and the memory but not to the first processor, wherein:

the first processor sends the information to the co-processor via the first interface; and performing the operation by the co-processor comprises the co-processor accessing the memory via the second interface.

24. The first processor of claim 23 wherein the first processor is operable, after executing the first instruction, executing additional instructions without waiting for the co-processor to perform the operation.

25. The first processor of claim 23 wherein the first processor is operable to receive a result of the operation from the co-processor, but the first processor is operable to execute additional instructions without waiting for the result.

26. The first processor of claim 23 wherein the first processor is operable to execute any number of instructions after the first instruction regardless of a state of the co-processor in performing the operation.

27. The first processor of claim 23 wherein the first instruction is executed on behalf of a task, and the first instruction specifies whether or not the task is to be suspended at a completion of the execution of the first instruction.

28. The first processor of claim 23 wherein the operation comprises modifying data stored at the memory location.

29. The first processor of claim 28 wherein modifying the data comprises performing at least one of operations ADD, INCREMENT, OR, AND or XOR on the data.

30. The first processor of claim 29 wherein modifying the data consists essentially in performing an operation ADD, INCREMENT, OR, AND or XOR on the data.

31. The first processor of claim 28 wherein the operation comprises the co-processor providing the modified data to the first processor.

32. The first processor of claim 23 wherein the operation comprises reading data stored at the memory location and providing the data to the first processor.

33. The first processor of claim 32 wherein the first instruction specifies update data to be written to the memory location in performing the operation.

34. The first processor of claim 23 wherein the first instruction specifies a destination for a result of the operation.

35. The first processor of claim 34 wherein the destination is a register of the first processor.

36. The first processor of claim 34 wherein the destination is within a memory.

37. The first processor of claim 34 wherein the first instruction specifies whether or not the first processor must increment a pointer to the destination.

38. The first processor of claim 34 wherein the first processor marks the destination as dirty when executing the first instruction.

39. The first processor of claim 23 wherein the first instruction specifies whether or not the first processor must increment the address.

40. The first processor of claim 23 in combination with the co-processor, wherein the co-processor performs the operation in a single instruction cycle.

41. A first processor for executing computer instructions, the first processor comprising circuitry for executing a first instruction, the first instruction specifying an address of a memory location and an operation to be performed on the memory location;

wherein executing the first instruction comprises the first processor sending information to a co-processor, the information specifying the address of the memory location and the operation to be performed;

wherein the first processor executes the first instruction without performing the operation and without accessing the memory location;

wherein the first processor is to execute a plurality of tasks, executing the first instruction comprises the first processor specifying to the co-processor a task executing the first instruction, and the operation comprises the co-processor specifying the task to the first processor.

42. The first processor of claim 41 wherein the first processor suspends the task upon executing the first instruction, and the first processor wakes up the task upon being informed that the operation has been performed.

43. The first processor of claim 41 wherein the first instruction specifies whether or not the task is to be suspended by the first processor until the co-processor has performed the operation.

44. A first processor for executing computer instructions, the first processor comprising circuitry for executing a first instruction, the first instruction specifying an address of a memory location and an operation to be performed on the memory location;

wherein executing the first instruction comprises the first processor sending information to a co-processor, the information specifying the address of the memory location and the operation to be performed;

wherein the first processor executes the first instruction without performing the operation and without accessing the memory location;

wherein the first processor is operable to operate with the first instruction being one of a plurality of first instructions to be executed by one or more processors comprising the first processor, each first instruction specifying an address of an associated memory location and an associated operation to be performed on the associated memory location;

wherein the execution of each of the first instructions comprises the one or more processors sending associated information to the co-processor, the associate information specifying to the co-processor the associated address and the associated operation;
wherein the one or more processors execute the first instructions without performing the associated operations and without accessing the associated memory locations;
wherein the associated operations are performed by the co-processor;
wherein one or more of the first instructions are each associated with a sequence number, and the one or more of the first instructions each specify whether sequencing is enabled or disabled;
wherein if the sequencing is disabled, the co-processor performs the associated operations in an order in which the co-processor receives the first instructions;
wherein if the sequencing is enabled, the co-processor performs each associated operation only when a current sequence number maintained by the co-processor becomes equal to the sequence number associated with the first instruction associated with the operation.

45. A semaphore handling method comprising:
(1) executing a first instruction by a processor, the first instruction specifying a semaphore operation to be performed by a co-processor, the semaphore operation being (i) a get-semaphore operation to acquire a semaphore by the processor, or (ii) a release-semaphore operation to release a semaphore by the processor;
wherein the execution of the first instruction comprises the processor sending information to the co-processor, the information specifying the semaphore operation;
wherein the processor executes the first instruction without performing the semaphore operation;
(2) performing the semaphore operation by the co-processor.

46. The method of claim 45 wherein the get-semaphore operation is to acquire a semaphore by a task executing the first instruction on the processor, and the release-semaphore operation is to release a semaphore by said task.

47. The method of claim 46 wherein:
said task is one of a plurality of tasks executed by one or more processors;
the first instruction is associated with a number to be used by the co-processor in determining when the semaphore operation is to be performed by the co-processor.

48. The method of claim 47 wherein:
the semaphore operation is the get-semaphore operation;
in performing the get-semaphore operation, the co-processor compares said number with a current number in the co-processor, and the co-processor performs the get-semaphore operation only when the current number becomes equal to said number specified by the first instruction.

49. The method of claim 48 further comprising the co-processor performing a release-semaphore operation, wherein in performing the release-semaphore operation the co-processor modifies the current number.

50. The method of claim 49 wherein the co-processor modifies the current number by incrementing the current number.

51. The method of claim 45 wherein the first instruction specifies a synchronization point associated with the semaphore.

52. The method of claim 45 further comprising, after executing the first instruction, executing additional instructions by the processor without waiting for the co-processor to perform the semaphore operation.

53. The method of claim 52 further comprising the co-processor providing a result of the semaphore operation to the processor, wherein the processor executes additional instructions without waiting for the result.

54. The method of claim 45 wherein the processor is operable to execute any number of instructions after the first instruction regardless of a state of the co-processor in performing the semaphore operation.

55. A processor for executing computer instructions, the processor comprising circuitry for executing a first instruction, the first instruction specifying a semaphore operation to be performed by a co-processor, the semaphore operation being (i) a get-semaphore operation to acquire a semaphore by the processor, or (ii) a release-semaphore operation to release a semaphore by the processor;
wherein the execution of the first instruction comprises the processor sending information to the co-processor, the information specifying the semaphore operation;
wherein the processor executes the first instruction without performing the semaphore operation.

56. The processor of claim 55 wherein the get-semaphore operation is to acquire a semaphore by a task executing the first instruction on the processor, and the release-semaphore operation is to release a semaphore by said task.

57. The processor of claim 56 wherein:
said task is one of a plurality of tasks to be executed by one or more processors;
the first instruction is associated with a number to be used by the co-processor in determining when the semaphore operation is to be performed by the co-processor.

58. The processor of claim 57 wherein:
the semaphore operation comprises the get-semaphore operation;
in performing the get-semaphore operation, the co-processor is to compare said number with a current number in the co-processor, and the co-processor is to perform the get-semaphore operation only when the current number becomes equal to said number specified by the first instruction.

59. The processor of claim 58 wherein the co-processor is to modify the current number in performing a release-semaphore operation.

60. The processor of claim 59 wherein the co-processor is to increment the current number in performing a release-semaphore operation.

61. The processor of claim 55 wherein the first instruction specifies a synchronization point associated with the semaphore.

62. The processor of claim 55 wherein the processor is operable to execute additional instructions after the first instruction without waiting for the co-processor to perform the semaphore operation.

63. The processor of claim 62 wherein the processor is operable to receive a result of the semaphore operation from the co-processor, but is further operable to executes the additional instructions without waiting for the result.

64. The processor of claim 55 wherein the processor is operable to execute any number of instructions after the first instruction regardless of a state of the co-processor in performing the semaphore operation.

* * * * *